Feb. 25, 1964 D. R. TAYLOR, JR 3,122,608

CIRCUIT FOR DISCRIMINATING BETWEEN SIGNAL COMPONENTS

Filed Aug. 23, 1960

INVENTOR.
DONALD R. TAYLOR, JR.
BY Fordyce A. Bothwell
ATTORNEY

United States Patent Office 3,122,608

Patented Feb. 25, 1964

3,122,608

CIRCUIT FOR DISCRIMINATING BETWEEN SIGNAL COMPONENTS

Donald R. Taylor, Jr., Philadelphia, Pa., assignor, by mesne assignments, to Philco Corporation, Philadelphia, Pa., a corporation of Delaware Filed Aug. 23, 1960, Ser. No. 51,319
1 Claim. (Cl. 178—7.3)

This invention relates to discrimination between components of a composite signal wherein the components occupy regions of different amplitude. While not necessarily limited thereto, the invention is particularly applicable to discrimination between video and synchronizing components of a composite television signal. Therefore the invention will be described with particular reference to such application.

As is well known, in a composite television signal the video and sync components are of different polarities with respect to the black level, and thus they occupy regions of different amplitude and it is possible to discriminate between them on the basis of amplitude. In order to make use of the sync component, it is necessary to separate that component from the composite signal or to produce a signal which distinguishes between the components.

The principal object of the present invention is to provide an improved circuit for discriminating between signal components such as those of a composite television signal.

Another object of the invention is to provide such a circuit which is simple and yet highly efficient in operation.

This invention is based on the concept of utilizing the unique operating characteristic of a tunnel diode to discriminate between components of a composite signal and to produce an output signal in response to one of said components. The preferred embodiment of the invention is also based on the further concept of providing inductance in circuit with the diode to produce an oscillatory output signal which can be transformed to a desired amplitude according to the requirement in any instance.

In accordance with this invention, there is provided a circuit for discriminating between the components of a composite signal, comprising a tunnel diode whose operating characteristic has positive and negative resistance regions, means for applying the composite signal across said diode, means for biasing said diode so that said components are respectively in different regions of the diode's operating characteristic, whereby the component in the negative resistance region of said characteristic produces a signal, and means for deriving the latter signal from the circuit. In the preferred embodiment an inductance is provided in circuit with the diode so that the signal component in the negative resistance region of the diode's operating characteristic produces an oscillatory signal.

Figure 1:
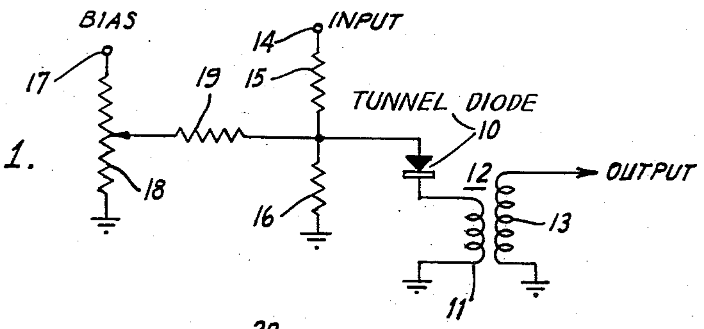

The invention may be fully understood from the following detailed description with reference to the accompanying drawing wherein:

FIG. 1 is a diagrammatic illustration of a preferred embodiment of the circuit according to this invention; and FIGS. 2 to 5 illustrate different ways of using the circuit to discriminate between components of a composite signal such as a composite television signal.

Referring first to FIG. 1, a tunnel diode 10 and an inductor 11 are connected in series, the inductor preferably being the primary winding of a transformer 12 from whose secondary winding 13 an output signal is derived. A composite signal, such as a composite television signal, is applied across the series-connected diode and inductor via input terminal 14, isolation resistor 15, and bias resistor 16. The tunnel diode 10 is biased by means of a positive D.C. bias voltage applied at terminal 17 across potentiometer 18 whose adjustable tap is connected through resistor 19 to the anode of the tunnel diode 10.

Figure 2:
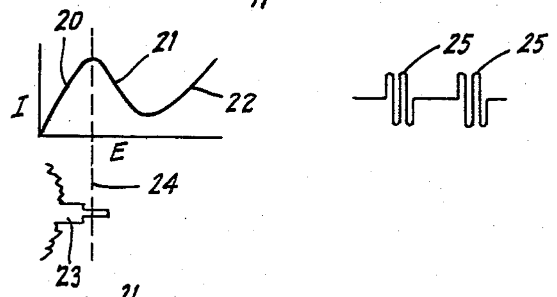

Referring now to FIG. 2, there is shown the current vs. voltage (I vs. E) characteristic of the tunnel diode 10. This operating characteristic comprises in succession a positive resistance region 20, a negative resistance region 21, and a positive resistance region 22. The applied composite television signal is represented at 23. In this signal the sync pulses are of positive polarity with respect to the black level, and the video component is of negative polarity with respect to said level. By appropriately adjusting the bias on the tunnel diode 10, the sync tips of the composite signal may be caused to be in the negative resistance region 21 to the right of the broken line 24, and the video component may be caused to be in the positive resistance region 20 to the left of said line.

Disregarding the inductor 11 for the moment, it will be apparent that with the tunnel diode thus biased it serves as an amplitude discriminator. Since the video component is below the bias level 24 it does not produce any output signal, but since the sync tip is above said level it produces an output signal.

In the preferred embodiment shown, due to the presence of inductor 11, each sync pulse produces a burst of oscillation which appears as an oscillatory voltage across inductor 11, the frequency of which is determined by the inductance and capacitance in the circuit including the capacitance of the diode. This voltage preferably is transformed to higher amplitude and is derived as the output as shown at 25.

Thus the circuit discriminates between the video and sync components, and in this instance it produces a signal representing the sync pulses. This signal may be supplied directly to the usual synchronizing circuits of a television receiver, or it may be rectified and then supplied to such circuits.

Figure 3:
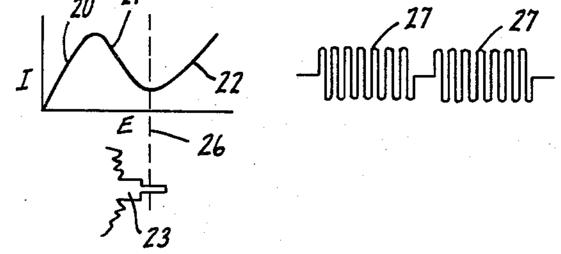

Referring now to FIG. 3, in this instance the tunnel diode 10 is biased so that the video component of signal 23 is in the negative resistance region 21 to the left of broken line 26, and the tips of the sync pulses are in the positive resistance region 22. Consequently the video component produces oscillations as shown at 27 which are interrupted during the sync pulse intervals. Thus the circuit discriminates between the video and sync components and produces a signal which distinguishes between the components.

Figure 4:
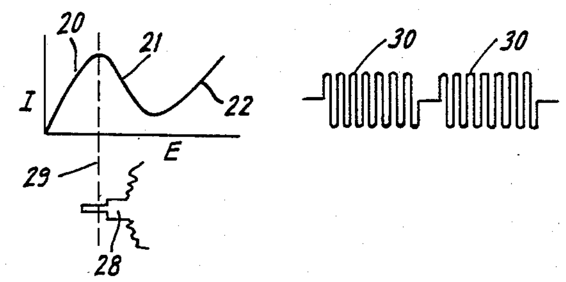

FIG. 4 shows one mode of operation where the composite television signal 28 has components which are reversed in polarity in comparison to the signal 23 in FIGS. 2 and 3. In this instance the tunnel diode is biased so that the tips of the sync pulses are in the positive resistance region 20 to the left of broken line 29, and the video component is in the negative resistance region 21 to the right of said line. Consequently the video component produces oscillations as shown at 30 which are interrupted during the sync pulse intervals.

Figure 5:
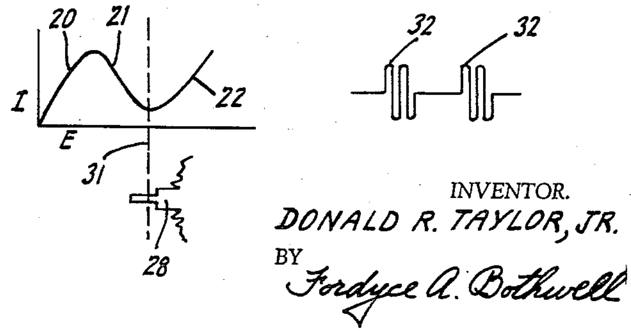

FIG. 5 shows another mode of operation where the tunnel diode 10 is biased so that the tips of the sync pulses of composite signal 28 are in the negative resistance region 21 to the left of broken line 31, and the video component is in the positive resistance region 22 to the right of said line. In this instance the sync tips produce bursts as shown at 32 which represent the sync pulses.

From the foregoing description, it will be seen that this invention provides a circuit which is simple and is capable of various modes of operation to discriminate between components of a composite signal such as a composite television signal.

While a single preferred embodiment of the invention has been illustrated and described, it is to be understood that the invention is not limited thereto but contemplates such modification and further embodiments as may occur to those skilled in the art.

I claim:

A circuit for producing an output only in response to one of the components of a composite television signal having video and sync components of opposite polarities with respect to a black level, said circuit comprising a tunnel diode whose operating characteristic has mutually-adjacent positive and negative resistance regions, an inductor in series with said diode, means for applying said composite television signal across the series-connected diode and inductor, means for biasing said diode so that said components are respectively in said different regions of the diode's operating characteristic, whereby the component in said negative resistance region causes an oscillatory voltage to be produced across said inductor while the component in said positive resistance region has no effect, and means for deriving said voltage from said inductor.

References Cited in the file of this patent

UNITED STATES PATENTS

| | | |
|---|---|---|
| 2,975,377 | Price et al. | Mar. 14, 1961 |
| 2,986,724 | Jaeger | May 30, 1961 |
| 3,061,790 | Theriault | Oct. 30, 1962 |